Dec. 6, 1949 — J. J. O'DONNELL — 2,490,153
WELD ROD HOLDER
Filed Feb. 9, 1948
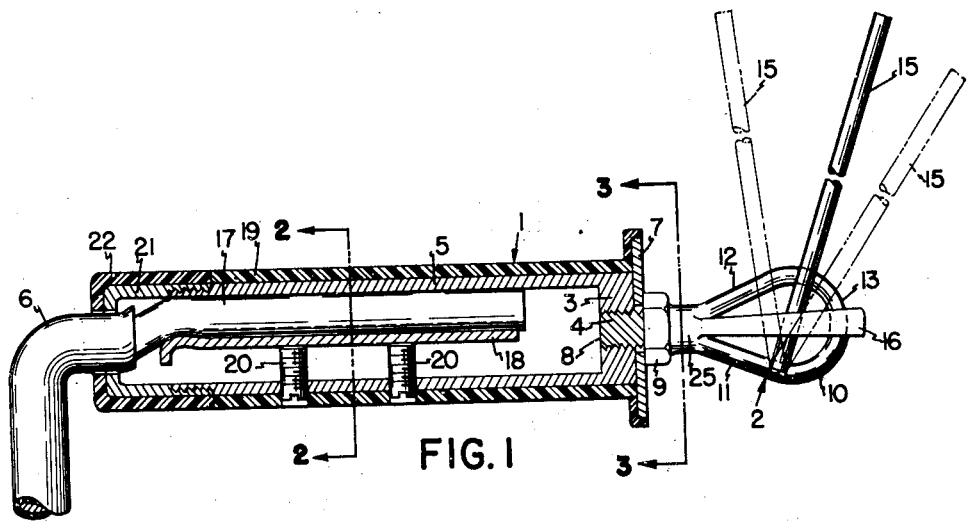
FIG. 1
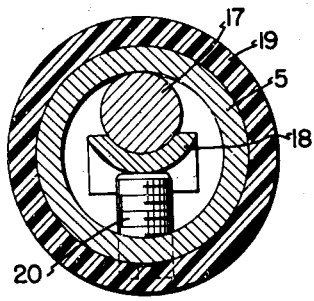
FIG. 2
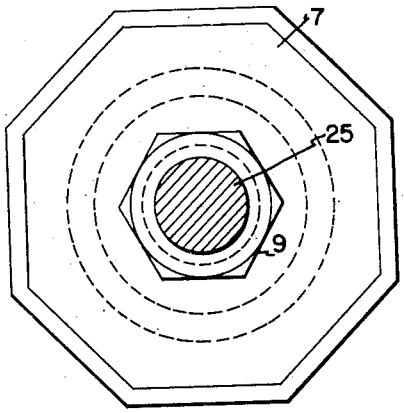
FIG. 3
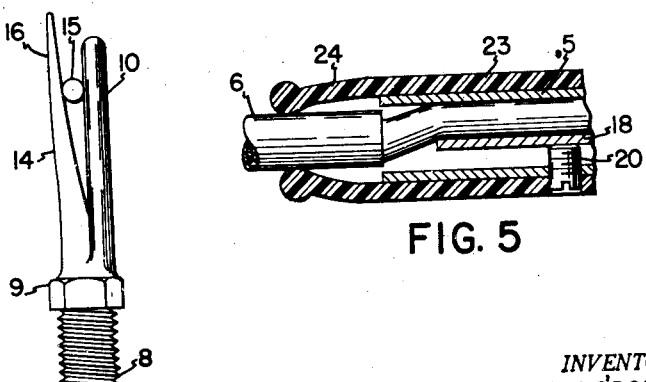
FIG. 4
FIG. 5
*INVENTOR.*
JAMES J. O'DONNELL
BY
HIS ATTORNEY Patented Dec. 6, 1949

2,490,153

UNITED STATES PATENT OFFICE 2,490,153

WELD ROD HOLDER

James J. O'Donnell, Somerville, Mass., assignor of one-half to Arthur L. McAvoy, Arlington, Mass.

Application February 9, 1948, Serial No. 7,153

2 Claims. (Cl. 219—8)

The present invention relates to a tool for holding a welding rod or such similar device, and, more particularly, to a welding rod used in electric welding, although it will apply equally well to other types of welding such as acetylene welding where a welding rod is consumed in the operation. It is particularly useful in electrical welding because of the electrical contact made with the holding tool.

The holder now used for this purpose is commonly of the type in which two jaws are pivoted to each other, one of which may be moved by a lever against the action of a spring for disengaging the welding rod being held. Other types of tools are of the pliers or forceps type, with some ratchet and locking means for adjustably holding the welding material in the jaws of a holder. While these devices are satisfactory for the purpose, they nevertheless are objectionable sometimes on account of their clumsiness and size and the fact that they have moving parts, and because frequently the lever or operating handle projects to one side and oftentimes interferes with the use of the tool in obstructed or narrow places.

The present invention overcomes these difficulties and objections in providing a very simple holding tool for the welding rod. The tool has no pivoted joints or levers and no projecting arms. It is symmetrical with the longitudinal direction of the handle, comparatively smooth, and extremely easy to use or operate. The welding rod may be placed in the holding element at any desired angle and will be securely held without the use of any clamping screw or other means which must be adjusted or tightened in applying the welding rod to the holder. In use as an electrical welding tool, the cable or conductor is inserted through the end of the tool and is readily clamped in place. The tool may be left on a metal floor without any danger of arcing or turning over into such a position that an arc can be struck.

Without further enumerating the other merits and advantages of the present invention, the invention will be described in connection with the drawings illustrating an embodiment thereof, in which:

Fig. 1 shows a longitudinal sectional view through the holder;

Fig. 2 shows a section taken on the line 2—2 of Fig. 1;

Fig. 3 shows a section taken on the line 3—3 of Fig. 1;

Fig. 4 shows a detail view; and

Fig. 5 shows a modification of a detail shown in Fig. 1.

In the device indicated in Figs. 1 to 4, the holder is formed with a handle 1 and a clamping head 2, which may be screwed into a wall 3 at the end of the holder as indicated at 4. As shown in Fig. 1, the wall 3 is of metallic material such as steel or iron and actually forms an end cap for the metallic tube 5, which is open at the other end to receive the cable 6. The tube 5 may be of the same material as the end 3 and may be of any desired shape, but preferably cylindrical or a regular polygon in section. At the forward end of the tube, a small flange 7 extends outward. This flange may be attached in any desired manner and may cover (as indicated in Fig. 1) the end cap 3 of the tube. As indicated in Fig. 3, the flange may be in the shape of a regular polygon, so that it will maintain its position and not roll. The weld rod holder 2 is provided at its end with a threaded stud 8, which may be screwed into the end plate of the cap 3, but this may also be permanently fixed in place by welding or other means. Just in back of the threaded stud is a collar 9 formed with flat sides, such as a hexagon, to permit the holder to be gripped easily by a wrench or pliers. Extending from the base 25 of the holder is a loop 10 of sufficiently heavy stock, of iron or steel preferably, to make it substantially non-yielding, although providing the usual spring flexibility in accordance with the gauge of the loop. The form of the loop is indicated in Fig. 1. The two sides 11 and 12 join in a single stem with the portions 11 and 12 of the loop extending substantially linear or slightly curved. The outer end of the loop 13 is more or less arcuate in form for a sector of approximately 180°. The loop is symmetrical with a center axis in the plane of the loop and this axis is aligned with that of the post or stud 8 and the collar 9. Extending from the base of the loop, where the linear sides 11 and 12 come together, is a tongue or bar 14. This tongue or bar at its base lies partly in the plane of the loop but deviates outwardly from this plane towards the end of the tongue, permitting a weld rod 15 to be wedged in between the face of the loop and the end of the tongue.

In Fig. 1, three positions are shown for the weld rod 15. However, it is obvious that the rod 15 may assume an infinite number of positions in practically all directions. The tongue 14 tends to be round and thicker at the base and flat and wider at the end 16, tapering gradually from the base away from the plane of the loop. The weld rod when in position is supported by both sides of the loop which contact the rod on one side, and by the tongue which contacts the rod on the other side. This contact, which is obtained through frictionally forcing the weld rod into the holder, furnishes a remarkably good electrical contact to carry the heavy current necessary in welding. The other contact connections are also equally efficient. The cable 6 is stripped of insulation as indicated at 17 and held clamped to the inside of the tube 5 by means of a clamping plate 18, which is tightened against one side of the stripped cable opposite to one side of the tube by means of clamping screws 20, 20 threading through the wall of the tube on the other side. The tube 5 is provided with an insulating cover 19. A cap 21 with an insulating cover 22 may be threaded to the end of the tube, the cap and cover having aligned holes through which the cable passes. In place of the end construction indicated in Fig. 1, that shown in Fig. 5 may be employed, in which the insulating cover 23 of the tube 5 may carry over the end of the tube in the form of a neck or flexible rubber hose 24 or some equivalent material, which hugs the cable 6.

In the operation of the tool for welding purposes, the welding rod is simply wedged into the holder in any direction desired. The holder is particularly adaptable for electrical welding, since the stripped cable is easily inserted into the end of the holder and good electrical contact is made between the cable and the welding rod.

Having now described my invention, I claim:

1. A tool for holding an electrical welding rod comprising a handle having a metallic connector adapted to engage an electrical line at one end of the handle, the the end of the handle extending in a longitudinal direction therefrom, a loop of substantially non-yieldable, metallic material having side arms converging and joining together to close the loop adjacent the end of the handle from which the loop extends, a tongue of substantially non-yieldable material positioned in diametrical relations to the loop and having a flat end section extending at least to the end of the loop parallel to the plane thereof and spaced therefrom, said tongue increasing in thickness towards its base and spaced decreasingly less from the loop towards the base where it joins the loop and forms with said side converging arms, in integral rod comprising the means by which said loop and tongue are attached to said handle.

2. A tool for holding an electrical welding rod, comprising a handle having a metallic connector adapted to engage an electrical line at one end of the handle, means threading into the other end of the handle in a longitudinal direction with the axis of the handle comprising a threaded end section, having extending outwardly therefrom, generally in the direction of the axis of the handle, a flat tongue element and an elongated loop, positioned substantially in parallel planes and spaced slightly closer at their ends from one another than the thickness of the weld rod adapted to be held, with the surface of the tongue facing the loop tapering towards the loop nearer the handle end and said tongue being diametrically positioned with respect to the loop.

JAMES J. O'DONNELL.

REFERENCES CITED

The following references are of record in the file of this patent:

UNITED STATES PATENTS

| Number | Name | Date |
|---|---|---|
| 1,353,028 | Clements | Sept. 14, 1920 |
| 1,550,229 | Stoody et al. | Aug. 18, 1925 |